United States Patent [19]
Schmidt et al.

[11] 4,455,246
[45] Jun. 19, 1984

[54] HEAT INSULATION MIXTURE

[75] Inventors: Sabine Schmidt; Peter Kleinschmit, both of Hanau; Rudolf Schwarz, Alzenau; Rainer Domesle, Maintal, all of Fed. Rep. of Germany

[73] Assignee: Degussa Aktiengesellschaft, Frankfurt am Main, Fed. Rep. of Germany

[21] Appl. No.: 383,212

[22] Filed: May 28, 1982

[30] Foreign Application Priority Data

Jul. 1, 1981 [DE] Fed. Rep. of Germany ....... 3125785

[51] Int. Cl.³ .............................................. C04B 43/00
[52] U.S. Cl. ...................................... 252/62; 106/98; 106/99; 501/95; 501/133; 428/920
[58] Field of Search ...................... 252/62; 106/98, 99; 501/95, 133; 428/920

[56] References Cited

U.S. PATENT DOCUMENTS

| | | | |
|---|---|---|---|
| 2,808,338 | 10/1957 | Bruno et al. | 106/69 |
| 3,055,831 | 9/1962 | Barnett et al. | 252/62 |
| 3,151,365 | 10/1964 | Glaser et al. | 252/62 |
| 3,467,535 | 9/1969 | Myles | 252/62 |
| 3,962,014 | 6/1976 | Hughes et al. | 156/276 |
| 4,212,755 | 7/1980 | Ruff et al. | 252/62 |
| 4,212,925 | 7/1980 | Kratel et al. | 252/62 |
| 4,255,195 | 3/1981 | Holter et al. | 106/98 |
| 4,298,387 | 11/1981 | Kratel et al. | 501/92 |
| 4,363,738 | 12/1982 | Kummermehr | 252/62 |

FOREIGN PATENT DOCUMENTS 1230947  5/1971  United Kingdom.

OTHER PUBLICATIONS

Hawley, Ed., *The Condensed Chemical Dictionary*, Ninth Edition, Van Nostrand, Reinhold, NY, p. 36.

Primary Examiner—John E. Kittle
Assistant Examiner—Robert A. Wax
Attorney, Agent, or Firm—Cushman, Darby & Cushman

[57] ABSTRACT

Heat insulation mixtures are employed both in the form of compacts and in the form of loose ballast. Heat insulating materials which contain an opacifier and thereby are impervious to the radiation which occurs possess extraordinarily good insulating activity. By using quartz powder of a specific particle size spectrum as opacifier, there can be attained optimal insulating properties preferred at high temperatures of use. This type of heat insulating material can be produced by mixing the individual components. It can contain known filler components and binders.

36 Claims, 3 Drawing Figures

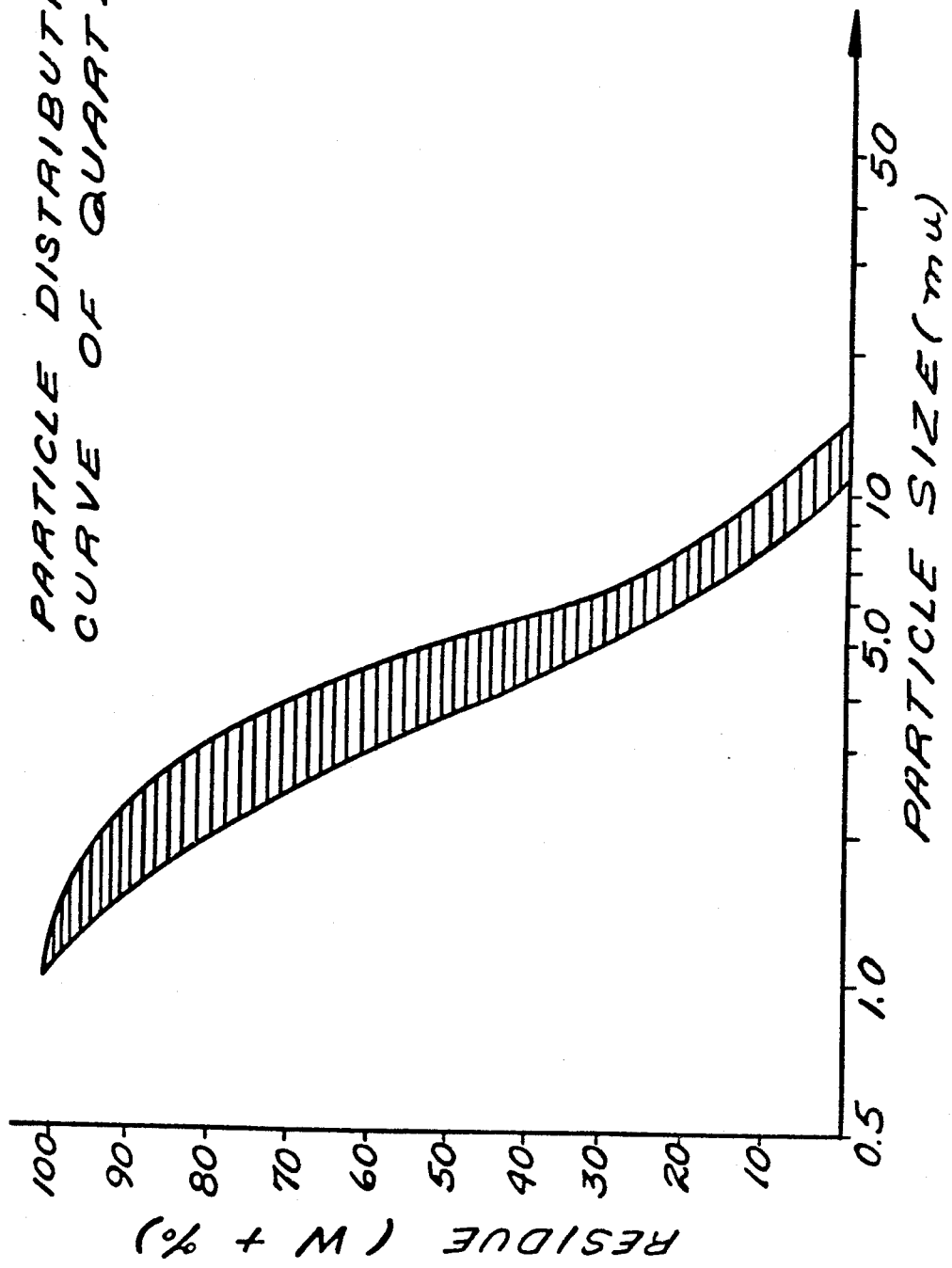

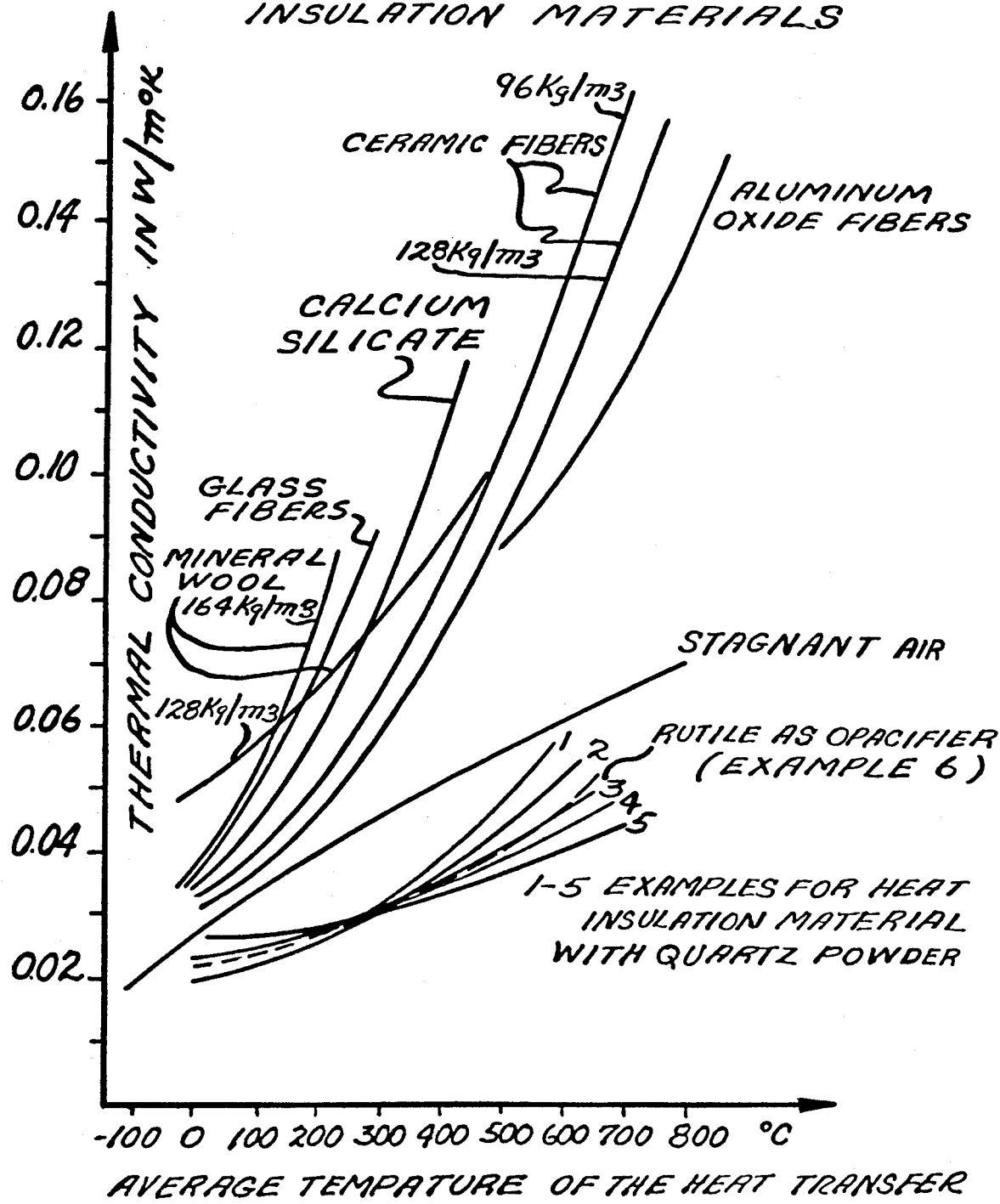

HEAT INSULATION MIXTURE

BACKGROUND OF THE INVENTION

There are known heat insulation mixtures which contain finely divided to highly dispersed materials as the main component and which, because of their extraordinarily small heat conductivity, are used to a considerable extent as excellent heat insulation agents.

These types of heat insulation mixtures can be employed in loose ballast form with suitable jacketing according to German OS No. 2904412, pages 4-5, or as compacted masses. However, generally the heat insulation mixtures are used as granulates compacted, for example, according to Belgian Pat. No. 857,490 or they are used in plates or molded pieces (compacts) of fixed dimension according to German AS No. 2036124. In the case of compacting, there are added to this heat insulation agent in small amounts a binder or preferably inorganic fibers to increase the mechanical strength.

Heat insulation mixtures which have an extraordinarily good insulating effect at high temperatures are impervious to the heat irradiation which occurs, whose wavelength is predominantly in the infrared range. For this purpose, there are incorporated into the heat insulation mixture opacifiers, which have the properties of reflecting, absorbing, and scattering the heat radiation which occurs, whereby in all cases an interplay of all properties is present.

The opacifier used most frequently until now is titanium dioxide in the modifications rutile, anatase, or brookite. According to Bruno U.S. Pat. No. 2,808,338, rutile scatters the heat radiation. Likewise, according to German AS No. 2524096, there can be used as opacifier ilmenite, as well as manganese oxide, iron oxide or chromium oxide; and according to German OS No. 2754956, there can be used silicon carbide, boron carbide, tantalum carbide, and tungsten carbide as well as graphite and carbon black.

Of the enumerated opacifiers, carbon black and graphite can only be employed at elevated temperatures if the permanent absence of oxygen is guaranteed. Otherwise, the opacifying agent properties of graphite and carbon black are lost through decomposition. Similar is also true for some of the oxides mentioned, especially manganese oxide.

The mentioned known opacifiers, especially the metal oxides, have become very expensive because of the increased price of the raw material. The carbides of silicon, boron, tantalum, or boron are even more expensive than, for example, the previously used opacifiers, such as e.g., titanium dioxide, because of the high production and grinding costs involved.

Consequently, there is a need to find an opacifier which has the same stopping properties as the known opacifiers but can withstand high temperatures and whose cost of use is low.

SUMMARY OF THE INVENTION

The subject matter of the invention is a heat insulation mixture which contains quartz powder as opacifier.

The quartz powder can be employed in an amount of 20 to 50 weight %, based on the total mixture. Special advantages are produced if the quartz content of the heat insulation mixture is 40 weight %.

Quartz is known to be transmissive over a wide spectral range for infrared and ultraviolet light. This knowledge apparently has previously prevented the employment of quartz as an opacifier. Thus, for example, according to EPO published application No. 13387, only inorganic opacifiers are employed which show an absorption maximum in the infrared region between 1.5 and 10 micrometers.

Now it has, however, surprisingly been found that quartz exhibits complete opacifier properties in the wavelength ranges of industrial use in which till now very expensive opacifiers have found acceptance. Likewise, it was not expected that with quartz powder of specific particle size spectrum, there are attainable thermal insulating effects of outstanding quality. Thus, for example, by combining different particle size spectra for this system, there are attained optimal insulating properties. An especial advantage is obtained since with quartz there is a particularly economical opacifier. According to the invention, there is preferably used quartz powder having particle size spectra whose distribution maxima of particle diameter extends from 1 to 15 micrometers.

Especially good results are produced if the quartz powder has the particle size distribution of FIG. 2. There can be employed in the heat insulation mixtures of the invention quartz containing minerals, as for example ground shale, whose main component is quartz. Ground shale contains 60 to 80 weight % quartz. These types of minerals can also be employed as sole opacifier.

The heat insulation mixtures of the invention can contain highly dispersed fillers and in a given case inorganic fibers and/or inorganic binders. As highly dispersed fillers, there can be employed the known carbon black and/or pyrogenically produced silica and precipitated silica with different physical-chemical properties. Preferably, there can be employed pyrogenically produced silica.

As inorganic fibers, there can be used aluminum silicate and as inorganic binders, e.g. water glass, silica sol. The heat insulation mixture of the invention can be blended in known manner, and in a given case pressed to compacts such as plates.

By using quartz powder as opacifier, there are obtained preferred optimal insulating properties at high operating temperatures.

BRIEF DESCRIPTION OF THE DRAWINGS

FIG. 1 is a graphical representation of the particle distribution curve of the quartz particles employed in Examples 1-4, FIG. 2 is a similar graphical representation of the particle distribution curve of the quartz particles employed in Example 5, and FIG. 3 is a graph of heat transfer versus thermal conductivity comparing quartz with other heat insulation materials.

Unless otherwise indicated, all parts and percentages are by weight.

The composition can comprise, consist essentially of, or consist of the stated materials.

DETAILED DESCRIPTION

The heat insulation mixture of the invention is explained in more detail and described in connection with the following examples:

An essential evaluation criterion of the quality of the heat insulation mixture above all is its thermal conductivity. However, for the evaluation, the thermal shape stability of these compacts is also essential. For if the compacts change their geometrical dimensions through shrinkage, not only does this reduce their thermal insulating properties themselves, but there also form intermediate spaces in the insulation layer which lead to a loss of insulating effect. The measurement of the thermal conductivity and thermal shape stability of the heat insulation mixtures takes place on round plates having the dimensions 100×20 mm.

The stated weight % values are based on the total mixture. The particle spectra were ascertained by means of a Coulter Counter.

EXAMPLE 1

There was produced in a high speed mixing apparatus at 5000 rpm a homogeneous mixture from 73 weight % of a pyrogenic silica, 20 weight % of a finely divided quartz, and 7 weight % of a mineral fiber made of aluminum silicate. The mixture was molded to plates having a liter weight of 300 g/l.

EXAMPLE 2

In the manner described in Example 1, there was produced a mixture from 63 weight % of a pyrogenic silica, 30 weight % of a finely divided quartz, and 7 weight % of an inorganic fiber made of aluminum silicate. The mixture was molded to plates having a liter weight of 300 g/l.

EXAMPLE 3

In the manner described in Example 1, there was produced a mixture from 43 weight % of a pyrogenic silica, 50 weight % of a finely divided quartz, and 7 weight % of an inorganic fiber made of aluminum silicate. The mixture was molded to plates having a liter weight of 300 g/l.

EXAMPLE 4

In the manner described in Example 1, there was produced a mixture from 53 weight % of a pyrogenic silica, 40 weight % of a finely divided quartz, and 7 weight % of an inorganic fiber made of aluminum silicate. The mixture was molded to plates having a liter weight of 300 g/l.

In Examples 1 to 4, there was employed a pyrogenic silica having a surface area according to BET of $300\pm30$ m$^2$/g. The quartz used has the following particle spectrum:

| Particle Diameter | Wt. % |
|---|---|
| 30–40 mµ | 0.6 |
| 20–30 mµ | 6.6 |
| 10–20 mµ | 21.2 |
| 6–10 mµ | 21.7 |
| 4–6 mµ | 23.6 |
| 2–4 mµ | 13.7 |
| 1–2 mµ | 12.6 |

A graphic representation of the particle size spectrum is given in FIG. 1.

EXAMPLE 5

In the manner described in Example 1, there was produced a mixture from 53 weight % of a pyrogenic silica having a surface area according to BET of $300\pm30$ m$^2$/g, 40 weight % of a finely divided quartz having a specific particle size spectrum and 7 weight % of an inorganic fiber made of aluminum silicate. The mixture was molded to plates having a liter weight of 300 g/l. The quartz meal has the following particle spectrum:

| Particle Diameter | Wt. % |
|---|---|
| 1 to 4 mµ | 53 |
| 4 to 5 mµ | 15 |
| 5 to 6 mµ | 11 |
| 6 to 7 mµ | 6.6 |
| 7 to 9 mµ | 8.8 |
| 9 to 13 mµ | 5 |

A graphic representation of this particle size spectrum is given in FIG. 2.

The heat insulation materials mentioned in Examples 1 to 5 at an ignition temperature of 1000° C. over a time span of 10 hours had a diameter shrinkage of their test plates of 2.5 to 3.0%. The thermal conductivity as a function of the average temperatures of heat transfer of the individual heat insulation materials having quartz compared to other heat insulation materials are graphically represented in the diagram according to FIG. 3.

From this diagram, it is evident that the optimum part of quartz is 40 weight %. However, there can be attained an additional improvement of the insulating effect within a specific temperature range of use by choosing a specific particle size composition of the quartz powder as described in Example 5.

EXAMPLE 6

(Comparison Example)

In the manner described in Example 5, there was produced and molded a mixture. In this case, there was employed rutile in place of quartz. The thermal insulating effect can be seen from FIG. 3.

EXAMPLE 7

In the manner described in Example 1, there was produced a mixture from 53 weight % of a precipitated silica having a surface area according to BET of about 150 to 250 m$^2$/g, 40 weight % of a finely divided quartz (particle size spectrum see Examples 1 to 4 or FIG. 1), and 7 weight % of an inorganic fiber made of aluminum silicate. The mixture was molded into plates.

Thermal conductivity at an average temperature of heat transfer of 270° C.: 0.037 W/m° K.

EXAMPLE 8

In the manner described in Example 1, there was produced a mixture from 63 weight % carbon black whose surface area according to BET is about 150 to 250 m$^2$/g, 30 weight % of a finely divided quartz (particle size spectrum see Examples 1 to 4), and 7 weight % of an inorganic fiber made of aluminum silicate. The mixture was molded to plates having a liter weight of 300 g/l.

Thermal conductivity at an average temperature of heat transfer of 165° C.: 0.028 W/m° K.

EXAMPLE 9

In the manner described in Example 1, there was produced a mixture consisting of 63 weight % of a pyrogenic silica, 30 weight % of a finely divided shale flour having a particle size spectrum of 2 to 100 mµ, and 7 weight % of an inorganic fiber made of aluminum silicate. The mixture was molded to plates having a liter weight of 300 g/l.

Thermal conductivity at an average temperature of heat transfer of 269° C.: 0.032 W/m° K.

The thermal conductivity values ascertained with the heat insulation mixtures of Examples 1 to 9 are collected in Table 1.

These same thermal conductivity values are likewise graphically represented in FIG. 3. Thereby, there are likewise graphically presented for comparison the thermal conductivity for mineral wool 164 kg/m$^3$, glass fibers, mineral wool 126 kg/m$^3$, calcium silicate, ceramic fibers 96 kg/m$^3$, ceramic fibers 126 kg/m$^3$, aluminum oxide fibers and stagnant air.

TABLE 1

| | Average Temperature of the Heat Transfer °C. | Absolute Thermal Conductivity in (W/mm °K.) |
|---|---|---|
| Example | | |
| 1 | | |
| 20 Wt. % Quartz (FIG. 1) | 163° C. | 0.024 |
| 73 Wt. % pyrog. silica | 268° C. | 0.028 |
| 7 Wt. % Aluminum silicate fiber | 374° C. | 0.037 |
| | 478° C. | 0.046 |
| 2 | | |
| 30 Wt. % Quartz (FIG. 1) | 164° C. | 0.024 |
| 63 Wt. % pyrog. silica | 268° C. | 0.027 |
| 7 Wt. % Aluminum silicate fiber | 374° C. | 0.034 |
| | 479° C. | 0.042 |
| 3 | | |
| 50 Wt. % Quartz (FIG. 1) | 164° C. | 0.025 |
| 43 Wt. % pyrog. silica | 268° C. | 0.028 |
| 7 Wt. % Aluminum silicate fiber | 371° C. | 0.033 |
| | 476° C. | 0.039 |
| 4 | | |
| 40 Wt. % Quartz (FIG. 1) | 164° C. | 0.024 |
| 53 Wt. % pyrog. silica | 266° C. | 0.027 |
| 7 Wt. % Aluminum silicate fiber | 373° C. | 0.033 |
| | 479° C. | 0.038 |
| 5 | | |
| 40 Wt. % Quartz (Particle size spectrum FIG. 2) | 163° C. | 0.027 |
| | 268° C. | 0.029 |
| 53 Wt. % pyrog. silica | 372° C. | 0.032 |
| 7 Wt. % Aluminum silicate fiber | 477° C. | 0.036 |
| | 529° C. | 0.039 |
| Comparison Example | | |
| 40 Wt. % Rutile | 166° C. | 0.026 |
| 53 Wt. % pyrog. silica | 266° C. | 0.028 |
| 7 Wt. % Aluminum silicate fiber | 372° C. | 0.032 |
| | 474° C. | 0.039 |
| 7 | | |
| 40 Wt. % Quartz (FIG. 1) | 164° C. | 0.031 |
| 53 Wt. % Precipitated silica | 270° C. | 0.037 |
| 7 Wt. % Aluminum silicate fiber | 375° C. | 0.041 |
| | 480° C. | 0.049 |
| 8 | | |
| 30 Wt. % Quartz (FIG. 1) | 63° C. | 0.027 |
| 63 Wt. % Carbon black | 114° C. | 0.026 |
| 7 Aluminum silicate fiber | 165° C. | 0.028 |
| | 217° C. | 0.026 |
| 9 | | |
| 30 Wt. % shale flour (slate flour) | 164° C. | 0.026 |
| 63 Wt. % pyrog. silica | 269° C. | 0.032 |
| 7 Wt. % Aluminum silicate fiber | 372° C. | 0.037 |
| | 483° C. | 0.047 |

Generally, the amount of quartz powder in the heat insulation mixture can range from 20 to 50 weight % of the mixture.

The highly dispersed filler can be 40 to 79 weight % of the mixture.

The inorganic fibers when employed can be 1 to 10 weight % of the mixture.

While aluminum silicate fibers are the preferred fibers, there can be used in place of (or in addition to the aluminum silicate fibers) other fibers such as mineral fibers, asbestos fibers, glass fibers, silicon carbide fibers, carbonfibers.

What is claimed is:

1. A heat insulation mixture containing quartz powder as an opacifier.
2. A heat insulation mixture according to claim 1 wherein the quartz powder is 20 to 50% of the composition.
3. A heat insulation mixture according to claim 2 containing about 40% quartz powder.
4. A heat insulation mixture according to claim 2 wherein the quartz powder is made of substantially pure quartz.
5. A heat insulation mixture according to claim 2 wherein the quartz powder is made from a mineral whose main component is quartz.
6. A heat insulation mixture according to claim 5 wherein the mineral is shale.
7. A heat insulation mixture according to claim 1 wherein the quartz powder has a particle size spectra whose distribution maxima of particle diameter is within the range from 1 to 100 millimicrons.
8. A heat insulation mixture according to claim 2 wherein the quartz powder has a particle size spectra whose distribution maxima of particle diameter is within the range from 1 to 100 millimicrons.
9. A heat insulation mixture according to claim 7 wherein the particle diameter is within the range from 1 to 15 millimicrons.
10. A heat insulation mixture according to claim 8 wherein the particle diameter is within the range from 1 to 15 millimicrons.
11. A heat insulation mixture according to claim 1 wherein the quartz powder has the particle size spectrum of FIG. 1.
12. A heat insulation mixture according to claim 2 wherein the quartz powder has the particle size spectrum of FIG. 1.
13. A heat insulation mixture according to claim 1 wherein the quartz powder has the particle size spectrum of FIG. 2.
14. A heat insulation mixture according to claim 2 wherein the quartz powder has the particle size spectrum of FIG. 2.
15. A heat insulation mixture according to claim 3 wherein the quartz powder has the particle size spectrum of FIG. 2.
16. A heat insulation mixture according to claim 13 wherein the quartz powder is made of substantially pure quartz.
17. A heat insulation mixture according to claim 14 wherein the quartz powder is made of substantially pure quartz.
18. A heat insulation mixture according to claim 15 wherein the quartz powder is made of substantially pure quartz.
19. A heat insulation mixture according to claim 13 wherein the quartz powder is made from a mineral whose main component is quartz.
20. A heat insulation mixture according to claim 14 wherein the quartz powder is made from a mineral whose main component is quartz.
21. A heat insulation mixture according to claim 15 wherein the quartz powder is made from a mineral whose main component is quartz.

22. A heat insulation mixture according to claim 1 containing a highly dispersed filler or a mixture of a highly dispersed filler and at least one member of the group consisting of inorganic fibers and inorganic binders.

23. A heat insulation mixture according to claim 2 containing a highly dispersed filler or a mixture of a highly dispersed filler and at least one member of the group consisting of inorganic fibers and inorganic binders.

24. A heat insulation mixture according to claim 23 wherein the quartz powder has a particle size spectra whose distribution maximum of particle diameter is within the range from 1 to 100 millimicrons.

25. A heat insulation mixture according to claim 24 wherein the quartz powder has the particle size spectrum of FIG. 2.

26. A heat insulation mixture according to claim 23 wherein the highly dispersed filler is carbon black, pyrogenic silica, or precipitated silica.

27. A heat insulation mixture according to claim 26 wherein the filler is carbon black.

28. A heat insulation mixture according to claim 26 wherein the filler is pyrogenic silica.

29. A heat insulation mixture according to claim 26 wherein the filler is precipitated silica.

30. A heat insulation mixture according to claim 26 wherein the quartz powder has a particle size spectra whose distribution maxima of particle diameter is within the range from 1 to 100 millimicrons.

31. A heat insulation mixture according to claim 22 which requires the presence of inorganic fibers.

32. A heat insulation mixture according to claim 23 wherein the inorganic fibers are aluminum silicate.

33. A heat insulation mixture according to claim 26 wherein the inorganic fibers are aluminum silicate.

34. A heat insulation mixture according to claim 22 wherein the inorganic fibers are 1 to 10 weight % of the mixture.

35. A heat insulation mixture according to claim 34 wherein the heat insulation mixture contains 20 to 50 weight quartz powder, 40 to 79% of highly dispersed filter, and 1 to 10 weight % of the inorganic fibers.

36. A heat insulation mixture consisting essentially of the composition of claim 22.

* * * * *